(No Model.) 3 Sheets—Sheet 1.
A. LAWRENCE.
APPARATUS FOR EXHIBITING OR DEMONSTRATING NON MAGNETIC WATCH MOVEMENTS.

No. 395,151. Patented Dec. 25, 1888.

WITNESSES: INVENTOR.

(No Model.) 3 Sheets—Sheet 2.

A. LAWRENCE.
APPARATUS FOR EXHIBITING OR DEMONSTRATING NON MAGNETIC WATCH MOVEMENTS.

No. 395,151. Patented Dec. 25, 1888.

WITNESSES,

INVENTOR, (No Model.) 3 Sheets—Sheet 3.
A. LAWRENCE.
APPARATUS FOR EXHIBITING OR DEMONSTRATING NON MAGNETIC WATCH MOVEMENTS.
No. 395,151. Patented Dec. 25, 1888.
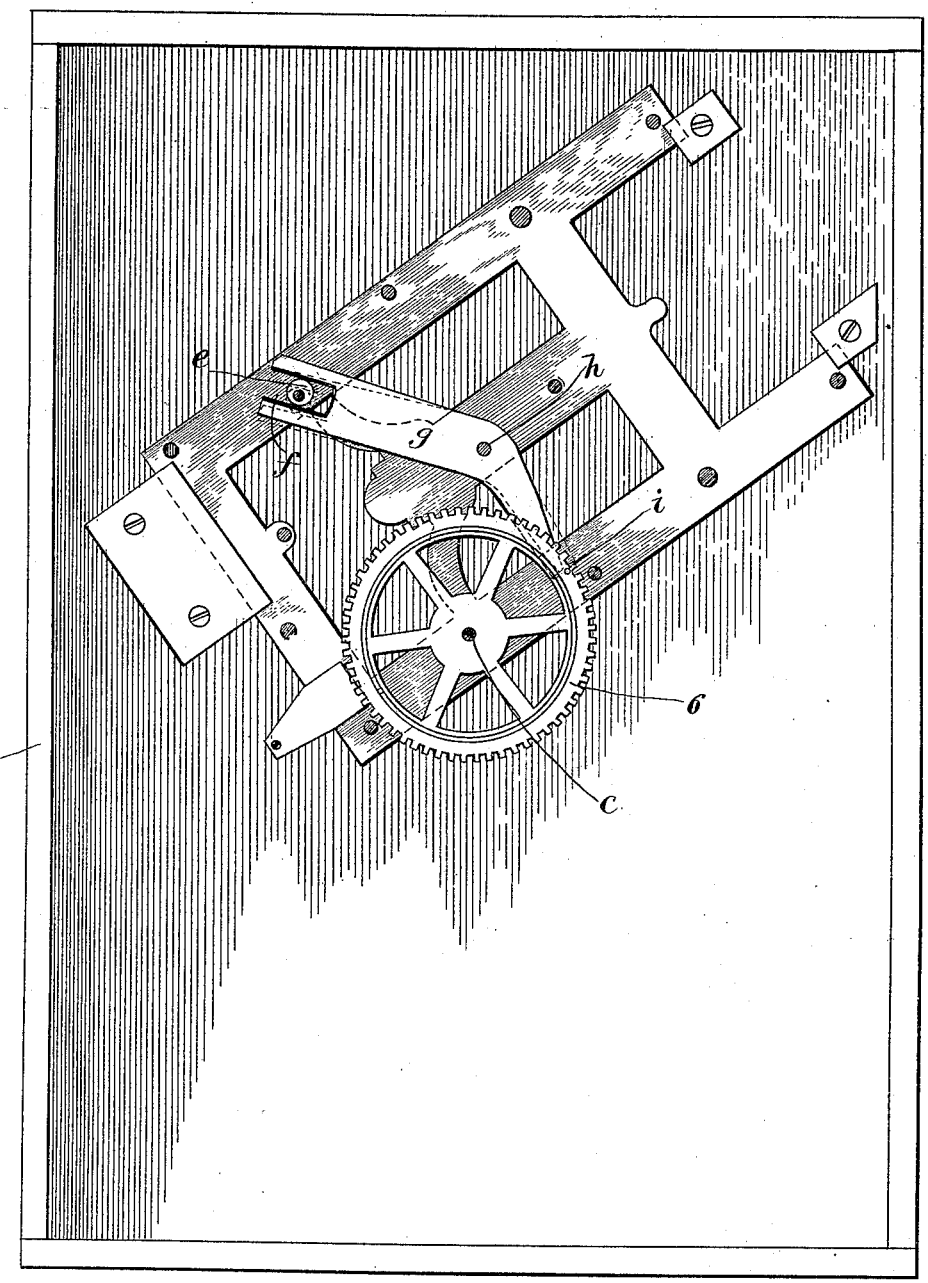
WITNESSES. FIG.3. INVENTOR.

UNITED STATES PATENT OFFICE.

ALVIN LAWRENCE, OF LOWELL, ASSIGNOR TO THE AMERICAN WALTHAM WATCH COMPANY, OF WALTHAM, MASSACHUSETTS.

APPARATUS FOR EXHIBITING OR DEMONSTRATING NON-MAGNETIC WATCH-MOVEMENTS.

SPECIFICATION forming part of Letters Patent No. 395,151, dated December 25, 1888.

Application filed July 19, 1888. Serial No. 280,429. (No model.)

*To all whom it may concern:*

Be it known that I, ALVIN LAWRENCE, of Lowell, in the county of Middlesex and State of Massachusetts, have invented certain new and useful Improvements in Apparatus for Exhibiting or Demonstrating Non-Magnetic Watch-Movements, of which the following is a specification.

This invention has for its object to provide improved means for exhibiting watch-movements and demonstrating the difference between a non-magnetic movement—i. e., one which has a balance-wheel, or balance-wheel and hair-spring, made of non-magnetic metals—and a movement which has a balance made in part of steel, as in the great majority of watches in general use. Non-magnetic movements, which are at the present time being brought to the attention of the public, have the advantage of being unaffected by close proximity to a dynamo-electric machine or other source of electricity, while in an ordinary movement, which for convenience I will call "magnetic," the balance, made in part of steel, becomes so magnetized by such proximity as to seriously affect the time-keeping qualities of the watch.

My invention consists in an automatic mechanism for alternately presenting a watch-movement to and withdrawing it from the field of a magnet, and thereby demonstrating to an observer whether the movement is magnetic or non-magnetic, the motion of a magnetic balance-wheel being stopped by the close proximity of a magnetic field to it, while the motion of a non-magnetic balance is unaffected by such proximity.

The invention also consists in certain details, all of which I will now proceed to describe and claim.

Figure 1:
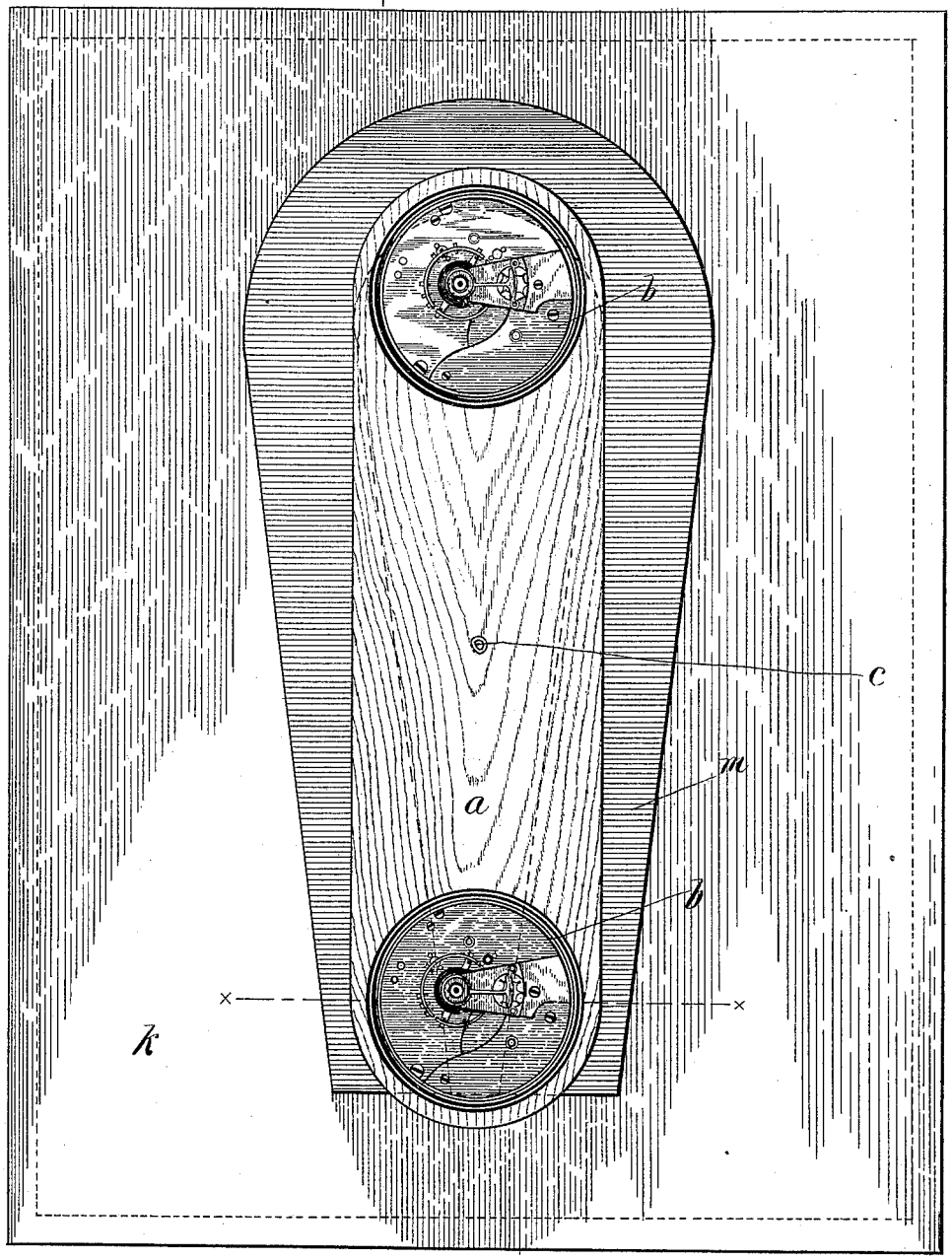
Figure 1A:
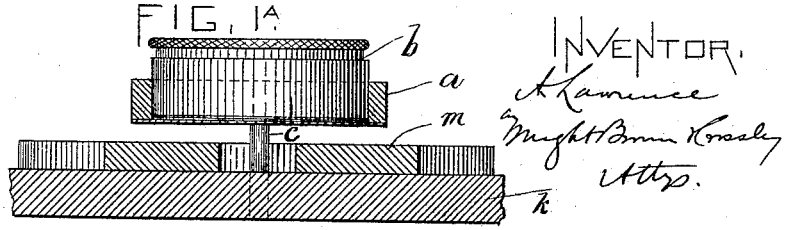
Figure 2:
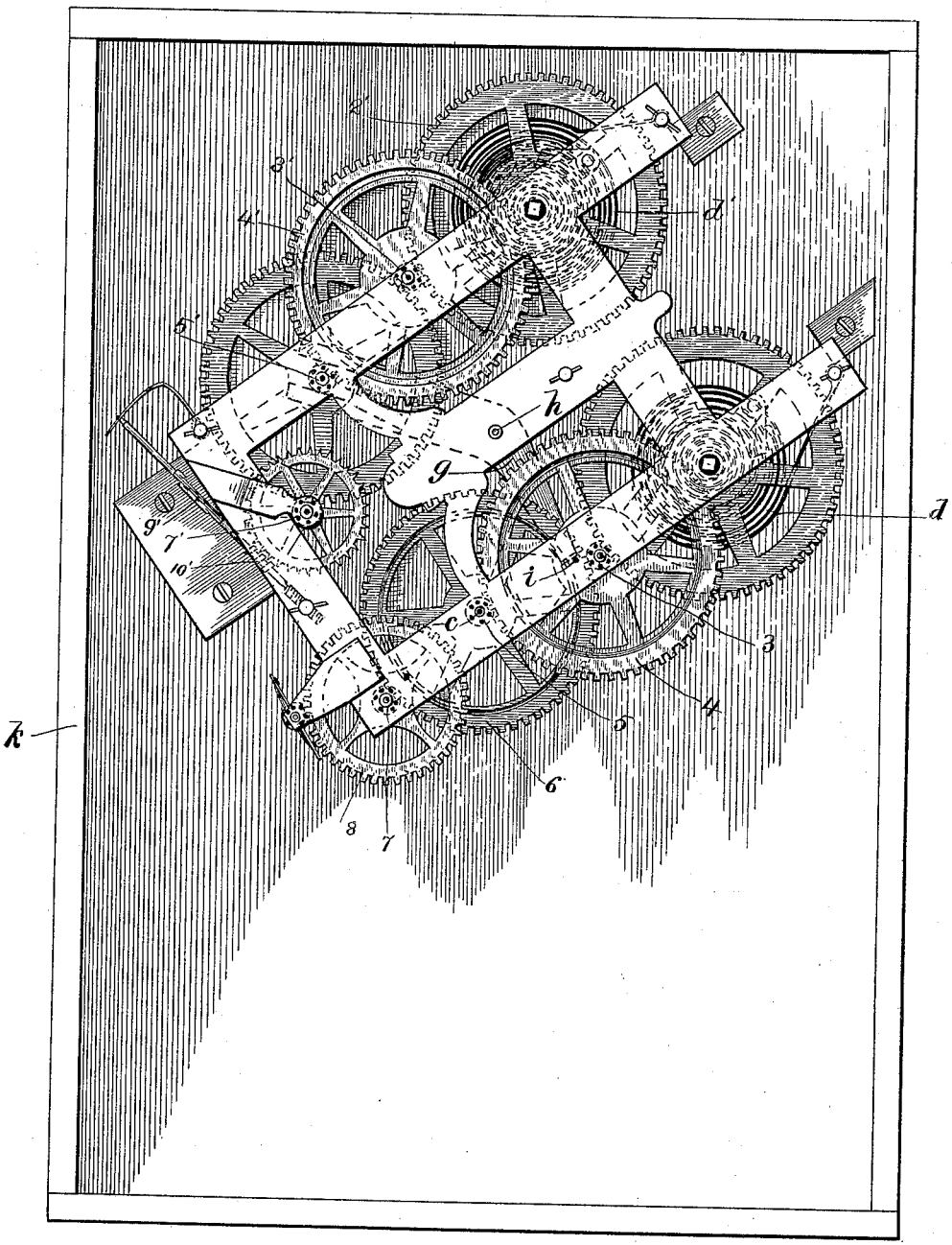

Of the accompanying drawings forming a part of this specification, Figure 1 represents a top view of an apparatus embodying my invention. Fig. 1$^A$ represents a section on line $x\,x$, Fig. 1. Fig. 2 represents a top view of the impelling mechanism, the upper part of the apparatus being removed. Fig. 3 represents a top view of a portion of said mechanism, certain parts thereof being removed.

The same letters of reference indicate the same parts in all the figures.

In the drawings, $a$ represents a watch-movement holder, consisting of an arm or bar having at its opposite ends cavities, each adapted to contain a watch-movement, $b$. Said holder is attached to a vertical shaft, $c$, which is impelled by a train of gearing, 2 3 4 5, actuated by a spring, $d$, and let off at suitable intervals by a second train, 2′ 3′ 4′ 5′, which is actuated by a spring, $d'$, and has on the arbor of its gear or pinion 5′ an eccentric, $e$, Fig. 3, which is located in a slot, $f$, in one end of a detent-lever, $g$, and by its rotation slowly oscillates said lever on a fixed center, $h$. The opposite end of said lever bears a lip or detent adapted to engage a pin, $i$, on a wheel, 6, which is affixed to the holder-carrying shaft $c$. The operation of the let-off train moves the detent-lever $g$, so as to cause it to release the shaft $c$ and its impelling-train at intervals and permit said train to give the shaft $c$ and the holder thereon a half-rotation, thereby reversing the position of the holder, the detent-lever $g$ moving to position to arrest the said train after a half-rotation.

The trains are contained in a casing, $k$, the holder $a$ being above the top of said casing. A permanent magnet, $m$, is supported by the top of the casing under the movement-holder, and the described motion of the holder brings each movement alternately over and away from the poles of the magnet. It will be seen, therefore, that by placing a magnetic movement at one end of the holder and a non-magnetic movement at the other end the difference between the two movements will be strikingly demonstrated by the successive changes of position of the holder $a$, the magnetic movement stopping when brought over the poles of the magnet and resuming its operation when removed therefrom, while the non-magnetic movement operates the same when over the poles of the magnet as when separated therefrom.

I do not limit myself to the described mechanism for successively presenting a watch-movement to and removing it from the field of a magnet, but may vary the same in any of the ways that would naturally suggest themselves to a skilled mechanic. For example, the construction may be such that the magnet will be moved instead of the watch-movements, or the holder *a* may be oscillated instead of being rotated in one direction.

It is obvious that the holder may carry but one watch-movement, instead of two, in which case two apparatuses may be used side by side, one having a magnetic and the other a non-magnetic movement.

The trains that impel the shaft *c* and eccentric *e* are provided with suitable escapements, whereby their rate of movement is governed.

I claim—

1. The combination, substantially as set forth, with a magnet and a watch-movement holder, of a motor whereby a watch-movement and the poles of the magnet may be alternately brought together and separated, as described.

2. The combination, substantially as set forth, with a magnet and a watch-movement holder, of a motor and a let-off mechanism therefor, whereby a watch-movement and the poles of the magnet may be held alternately in close proximity to each other and away from each other, as described.

3. The combination of a shaft, *c*, a motor whereby said shaft may be rotated, a let-off mechanism whereby said shaft is alternately held and released, a watch-movement holder attached to said shaft, and a magnet supported in suitable proximity to said holder, as set forth.

4. The combination of the shaft *c*, the spring-impelled train whereby said shaft is rotated, the watch-movement holder attached to said shaft, a magnet arranged, as described, with relation to said holder, the detent-lever *g*, arranged to hold and release the said train, the eccentric *e*, engaged with said lever, and the spring-impelled train whereby said eccentric is revolved and caused to oscillate said lever, as set forth.

In testimony whereof I have signed my name to this specification, in the presence of two subscribing witnesses, this 11th day of July, A. D. 1888.

ALVIN LAWRENCE.

Witnesses:
C. F. BROWN,
A. D. HARRISON.